(12) United States Patent
Winkler

(10) Patent No.: US 9,540,087 B2
(45) Date of Patent: Jan. 10, 2017

(54) VESSEL COMPRISING A ROTOR HAVING A FLAP ARRANGED NEAR THE ROTOR

(71) Applicant: Jørn Paul Winkler, London (GB)

(72) Inventor: Jørn Paul Winkler, London (GB)

( * ) Notice: Subject to any disclaimer, the term of this patent is extended or adjusted under 35 U.S.C. 154(b) by 0 days.

(21) Appl. No.: 14/439,325

(22) PCT Filed: Oct. 30, 2013

(86) PCT No.: PCT/EP2013/072714
§ 371 (c)(1),
(2) Date: Apr. 29, 2015

(87) PCT Pub. No.: WO2014/067998
PCT Pub. Date: May 8, 2014

(65) Prior Publication Data
US 2015/0274272 A1 Oct. 1, 2015

(30) Foreign Application Priority Data
Oct. 31, 2012 (EP) ..................................... 12190798

(51) Int. Cl.
*B63H 9/02* (2006.01)
*F15D 1/12* (2006.01)

(52) U.S. Cl.
CPC *B63H 9/02* (2013.01); *F15D 1/12* (2013.01); *Y02T 70/58* (2013.01)

(58) Field of Classification Search
CPC ............... B63H 9/00; B63H 9/02; B63H 9/06; F15D 1/12
USPC ................. 114/39.3, 102.13, 39.31
See application file for complete search history.

(56) References Cited

U.S. PATENT DOCUMENTS

| 1,640,891 | A |   | 8/1927 | Hugo |
|---|---|---|---|---|
| 2,713,392 | A |   | 7/1955 | Von Karman et al. |
| 4,582,013 | A | * | 4/1986 | Holland, Jr. ............. B63H 9/02 114/39.3 |

(Continued)

FOREIGN PATENT DOCUMENTS

| CN | 85105039 A | 9/1986 |
|---|---|---|
| CN | 101198516 A | 6/2008 |

(Continued)

OTHER PUBLICATIONS

International Preliminary Report on Patentability issued in corresponding International Application No. PCT/EP2013/072714 issued on May 5, 2015.

(Continued)

*Primary Examiner* — Lars A Olson
(74) *Attorney, Agent, or Firm* — Nixon & Vanderhye P.C.

(57) ABSTRACT

The invention relates to vessel (1) comprising a hull (3) and a deck (2), a substantially cylindrical rotor (6) having a peripheral wall (8) rotatable with respect to the deck (2) around a longitudinal center line (20), the rotor (6) being mounted on the deck (2) in such a manner that in an operational state the rotor (6) is substantially vertically oriented, characterized in that a flap (18) is arranged near the rotor (6) extending substantially in a plane which is parallel to the rotational axis of the rotor (6), and the length of the flap chord (Rfc) is between 20%-90% of the rotor (6) diameter (Dr), wherein the position of the flap (18) can be adjusted with reference to the longitudinal center line (20).

13 Claims, 5 Drawing Sheets

(56) References Cited

U.S. PATENT DOCUMENTS

2009/0241820 A1    10/2009  Rohden
2011/0236207 A1     9/2011  Klimov et al.
2014/0137781 A1     5/2014  Rohden

FOREIGN PATENT DOCUMENTS

CN    101454197 A    6/2009
CN    102030104 A    4/2011
DE       426 815     3/1926
GB       244 490     7/1926

OTHER PUBLICATIONS

International Search Report for PCT/EP2013/072714 mailed Nov. 29, 2013, four pages.
Written Opinion of the ISA for PCT/EP2013/072714 mailed Nov. 29, 2013, four pages.
Notification of the First Office Action dated Jul. 20, 2016 issued in Chinese Application No. 201380068794.9 with English translation (15 pages).

\* cited by examiner

VESSEL COMPRISING A ROTOR HAVING A FLAP ARRANGED NEAR THE ROTOR

This application is the U.S. national phase of International Application No. PCT/EP2013/072714 filed 30 Oct. 2013 which designated the U.S. and claims priority to EP Patent Application No. 12190798.4 filed 31 Oct. 2012, the entire contents of each of which are hereby incorporated by reference.

FIELD OF THE INVENTION

The invention relates to a vessel comprising a hull and a deck, a substantially cylindrical rotor having a peripheral wall rotatable with respect to the deck around a longitudinal center line, the rotor being mounted on the deck in such a manner that in an operational state the rotor is substantially vertically oriented. The invention also relates to a method for operating a rotor having such a flap.

BACKGROUND OF THE INVENTION

A rotor ship, or Flettner ship, is a ship designed to use the Magnus-effect for propulsion. To take advantage of this effect, it uses cylindrical rotors which are powered by an drive motor. The Magnus-effect is a force acting on a spinning body in a moving airstream, which acts perpendicularly to the direction of the airstream. This force can be put to good use for the propulsion of the vessel, thereby saving fuel.

A disadvantage of such Flettner rotors is that they need to be large, and therefore heavy and bulky, in order to provide sufficient propulsive force to the vessel. As a consequence, the Flettner rotor also utilizes large quantities of material for their construction. A further disadvantage of Flettner rotors is that their performance is relatively low at low wind speeds and with wind blowing from an undesirable wind direction.

It is an object of the invention to overcome or ameliorate at least one of the aforementioned disadvantages.

SUMMARY OF THE INVENTION

Hereto the vessel according to the invention is characterized in that a flap is arranged near the rotor extending substantially in a plane which is parallel to the rotational axis of the rotor, and the length of the flap chord Rfc is between 20%-90% of the rotor diameter, wherein the position of the flap can be adjusted with reference to the longitudinal center line. The flap substantially increases lift of the rotor, therefore allowing it to be smaller while generating the same propulsive force, also enabling it to be constructed using lower quantities of material. Furthermore, the Flettner rotors' performance is improved at low wind speeds and with wind blowing from an undesirable wind direction, due to the adjustability of the flap.

Preferably, the rotor and flap will be made of a material selected from but not be limited to heavy cast iron, aluminium, aluminium alloy or laminated materials such as composites, carbon fiber, and fiberglass that have high strength-to-weight ratios.

Advantageously, by increasing the length of the flap chord up to a certain value, the rotor force vector and therefore the lift force and lift/drag ratio will increase exponentially. It is of further advantage to use of the flap with the rotor, because the use of the flap can increase the rotation speed up to 1500 r.p.m of the rotor when the wind speed is high.

Furthermore, a flap can have a certain camber, which will increase the lift generated by the rotor. The flap camber can be achieved with one of many well-known methods including one or more hinged and/or slotted components to cater for operation on both tacks.

Preferably, the flap will have a cross-section shape selected but not be limited to a flat-plate, a hollow vane or an aerofoil.

Advantageously, by having a flap with a certain camber this could provide with additional solutions for rotors having different geometries and the adaptation will depend on the geometry of the rotor and the vessel where the rotor will operate. Furthermore, it is advantageous to provide a flap having a different cross-sectional shape, because this provides the advantage of reducing the material used in the rotor and increases the lift force and decreases the lift/drag ratio of the rotor.

In a preferred embodiment of the invention, the flap comprises an upper end and a lower end, the lower end of the flap being guided along a circular trajectory supported on the deck, the center of the circular trajectory being aligned with the longitudinal center line of the rotor.

This provides the advantage of having an independent system for accurate controllability of the position of the flap around the rotor in order to optimise the Magnus-effect of the rotor.

Furthermore, the flap can be hingedly connected to the rotor at a position on the longitudinal center line above or at the upper end of the rotor via the upper end of the flap.

Moreover, the flap comprises an upper end and a lower end, the flap being hingedly connected near the lower end of the rotor at a position on the longitudinal center line via the lower end of the flap or the flap being hingedly connected to the rotor near the upper end of the rotor at a position on the longitudinal center line via the upper end of the flap. The other flap end is also hingedly connected near the respective rotor end close to that other flap end, at a position on the longitudinal center line of the rotor.

Advantageously, by having the flap hingedly connected to the rotor, the rotor and the flap can be assembled and disassembled easily. Also, this configuration will provide extra strength to the assembly.

It should be understood that the rotor can be rotatably mounted on a static mast which is connected to the peripheral wall of the rotor, for instance via a lower edge and/or a upper edge of the rotor or a position in between.

Advantageously, this creates autonomy of the flap from the rotor, in this manner the flap can be adjusted independently from the rotor providing optimal control of the rotor for reducing energy consumption.

Accordingly, the flap comprises a leading edge and a trailing edge, the leading edge of the flap being positioned at a distance D from the peripheral wall of the rotor of between 0-1 meters. Furthermore, the flap is provided with flap positioning means that allow the flap to be positioned in such a way that the chord of the flap is at an angle α of between 30°-60° from the apparent wind.

The fact that the flap can be position at a different distance and a specific angle of the apparent wind advantageously provides a very efficient way of optimizing the use of the flap for providing the extra lift force needed by the rotor and also provides the possibility of having a relatively lighter rotor.

In a preferred embodiment, the flap is a wedge flap, having a chord length Rfc between 10%-70% of the rotor diameter Dr. The wedge flap can comprise side walls joining in the trailing edge, having a maximum angle of 150° with respect to each other relative to their joining position at the trailing edge.

Advantageously, this specific configuration will improve the aerodynamics of the flap, providing a lightweight structure and increasing the flap effectiveness by assisting the control of the rotor.

Accordingly, the flap can comprise a winglet on the flap trailing edge. The winglet transversally extends away from the flap chord about 0.5-1 meter at each side of the flap trailing edge and it extends substantially perpendicular to the flap chord Rfc.

Advantageously, the winglet on the flap trailing edge increases the effectiveness of the flap on both sides of the flap surface and the surface of the rotor itself, by improving the lift/drag ratio of the rotor.

Preferably, the winglet will have a cross-sectional shape selected but not limited to a flat-plate, a hollow vane, a wedge shape or a round shape.

Furthermore, the invention relates to a method of operating the rotor comprising the step of orienting the flap such that the flap chord has an angle β between 45°-60° relative to the longitudinal center line.

Advantageously, by orientating the flap to an angle between 45°-60° relative to the longitudinal center line, the rotor and the flap will perform at their best in order to increase the lift force and lift/drag ratio.

According to an embodiment of the invention, the rotor can be folded from a vertical to a horizontal position, simultaneously with the flap. The refraction of the rotor and the flap can be done when the rotor and the flap edges are in assembled state.

It is advantageous to provide a vessel wherein the rotor and the flap are in a folded position during conditions of heavy wind in order to reduce interaction of the end rotor and flap with waves and wind.

Additionally, the vessel can be provided with hydraulic systems for assisting the retraction of the rotor and flap. The hydraulic system provides the advantage of relatively reliable operation, especially when high moisture and salt levels interfere with moving parts.

A device for producing a high drive force having a small flap is described in U.S. Pat. No. 4,630,997. This document describes a non-circular hollow body having a small flap projecting outwardly with respect to the non-circular hollow body. The non-circular hollow body is capable of reducing the drag force when the incidence angle α of the non-circular rotor is below 90°. The non-circular cylinder has to be well oriented in order to perform properly, as if it is not the case, the rotation of the non-circular cylinder delays and reduces the separation of the air flow from the non-circular surface of the rotor and the amount of turbulence on the non-circular hollow body increases. Moreover, the flap described in U.S. Pat. No. 4,630,997 is incompatible with the rotor mentioned in the present patent application, as the body of U.S. Pat. No. 4,630,997 has to be static in order to perform, as opposed to the dynamic, rotating rotor as described in the present application.

Moreover, U.S. Pat. No. 2,713,392 describes the use of a vertical circular cylinder on a ship for propulsion, having a cylinder made permeable to air, which aspirates air into the cylinder to maintain air flow around the cylinder surface. A short deflector causes separated air streams around the cylinder to have different-length paths, resulting in a transverse force on the cylinder. This configuration needs additional power to move the cylinder and also has a large energy consumption due to the required drive power, as well as undesirable mechanical complexity due to the need to continuously rotate the cylinder at several hundred revolutions per minute in order to produce the desired propulsive force. Due to the different mechanics involved, the deflector of U.S. Pat. No. 2,713,392 is therefore unsuitable to be used with a Flettner rotor.

BRIEF DESCRIPTION OF THE DRAWINGS

Other aspects, features and details of the present invention will be readily understood by reference to the following detailed description of preferred embodiments, taken in conjunction with the drawings and from the appended claims. In the appended drawings:

DETAILED DESCRIPTION

Figure 1:
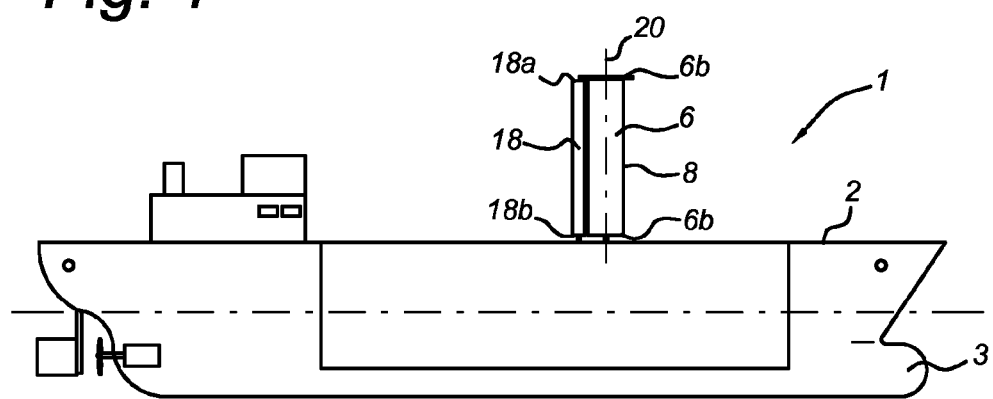
FIG. 1 shows a schematic side view of a vessel equipped with a rotor and a flap, wherein the rotor is mounted over the deck of the vessel.

FIG. 1 shows schematic side view of a vessel 1 equipped with a rotor 6 and a flap 18 in an operational state, according to an embodiment of the invention. The vessel 1 is provided with a deck 2 formed in the upper part of a hull 3. The rotor 6 is preferably substantially cylindrical, and it is placed on the deck 2 of the vessel 1. The rotor 6 comprises a peripheral wall 8 rotatable with respect to the deck 2 around a longitudinal center line 20. The rotor 6 further comprises an upper end 6a and a lower end 6b. Parallel to the rotor, the flap 18 provided which rotational freedom with respect to the rotor 6. The rotational freedom concerns rotation around the longitudinal center line 20 of the rotor 6. The flap 18 comprises an upper end 18a and a lower end 18b. The flap 18 further comprises at its lower end 18b with means for being guided along a circular trajectory supported on the deck 2 for providing the rotational freedom. The lower end 18b of the flap 18 can be guided by different means such a track for guiding the flap 18 having a fix or changeable path. Also, a wheel arranged below the lower flap end 18b can be used for guiding the flap 18 around the rotor 6.

In a constructional variant, the rotor 6 and the flap 18 shown here can be retractable/expandable which can be folded into a retracted state in a receiving chamber (not illustrated) from the deck 2.

Alternatively, the flap 18 can be hingedly or pivotably connected to the rotor 6 near its upper end 18a at a position on the longitudinal center line 20. In a preferred embodiment, the flap 18 can be hingedly connected to the rotor 6 near its lower end 18b at a position on the longitudinal center line 20 and rotated by means of a bearing inserted into or implemented somehow in the hingeable means connecting the rotor 6 and the flap 18 near its lower part 18*b*.

Figure 2:
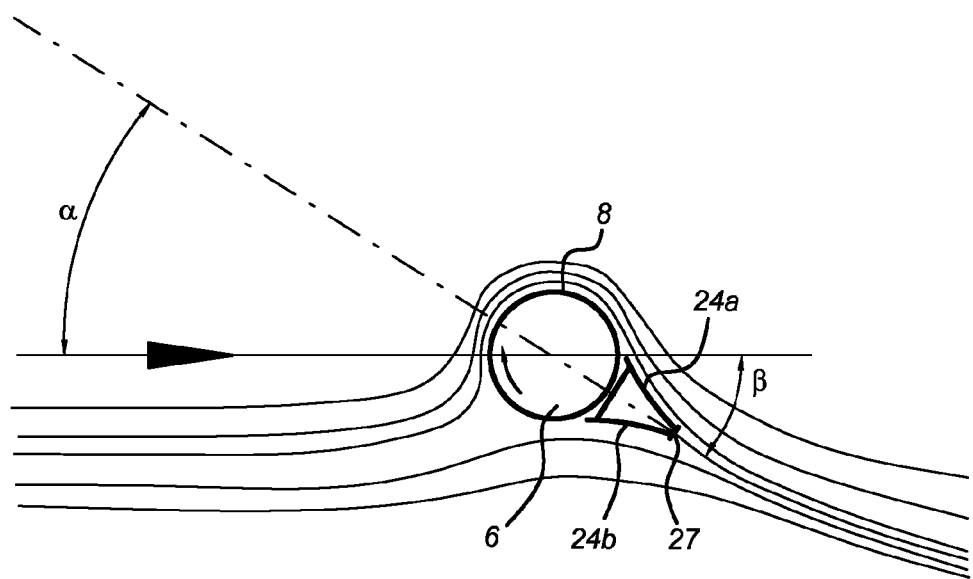
FIG. 2 shows a diagram of the wind flow directly over the surfaces of the rotor and the flap.

FIG. 2 shows a diagram where the rotor 6 comprises a wedge flap 8 wherein the wind flow creates a movement of the rotor 6 and wedge flap 18 is oriented accordingly in order to increase the lift force and lift/drag ration of the rotor 6. Moreover, the wedge flap 18 comprises side walls 24*a*, 24*b* joining together in a trailing edge 27. Furthermore, each of the side walls 24*a*, 24*b* of the wedge flap 18 comprises a leading edge 26 arranged near the rotor 6 extending substantially in a plane which is parallel to the rotational axis of the rotor 6.

It should be noted that the side walls 24*a*, 24*b* of the wedge flap 18 can be provided with a different camber in order to improve the lift at a low wind flow. In one specific form, the side walls 24*a*, 24*b* can have a concave surface with respect to the wind flow direction.

It will be appreciated that the length of the wedge flap chord Rfc is substantially smaller that the diameter Dr of the rotor 6. The wedge flap 18 is shown at a flap angle $\alpha$ relative to the wind flow direction. Relative wind speed flow makes the rotor 6 rotate relative to the deck 2 around a longitudinal center line 20. The flap angle $\alpha$ is preferably between 30°-60° relative to the apparent wind flow.

Figure 3:
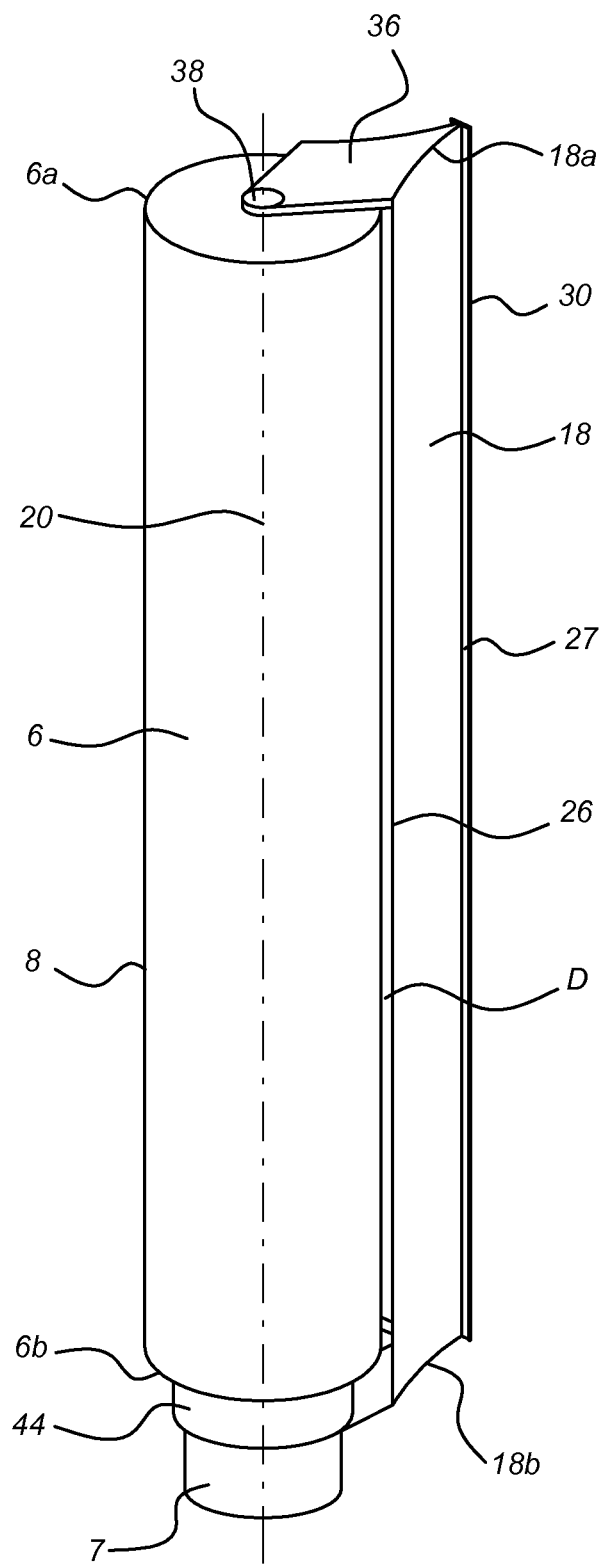
FIG. 3 shows a perspective view of the rotor and the flap in assembled state.

FIG. 3 shows the rotor 6 and the wedge flap 18 in assembled state. It will be appreciated that the wedge flap 18 is hingedly connected to the rotor 6 at the lower and upper parts 6*a*, 6*b* by hingeable means. As illustrated, a hinge 36 is connecting the rotor 6 with the wedge flap 18 at the upper ends 6*a*, 18*a* of the rotor 6 and flap 18. The hinge is secured to the upper end of the rotor 6 by means of a fastening means 38. The fastening means 38 selected but not limited to a screw, a pin, a bolt or a nut. As illustrated, a static mast 7 is connected to the rotor 6 near the lower edge 6*b* of the rotor 6. Moreover, the wedge flap 18 comprises at its trailing edge 27 a winglet 30 which transversally extends at each side of the flap trailing edge 27 preferably between 0.5-1 meter at each side. The wedge flap 18 as here represented is at a distance D from the peripheral wall 8 of the rotor 6. It should be understood that the distance D between the peripheral wall 8 of the rotor 6 and the leading edges 26 of the wedge flap 18 is preferably between 0-1 meter, and most preferably between 0.5-1 meter, being such a distance D dependent on different parameters such as the length of the flap chord Rfc or the diameter Dr of the rotor 6. Moreover, a flap hinge 44 slid into the static mast 7 can be seen in assembled state with the flap 18 at its lower part 18*b*.

Figure 4:
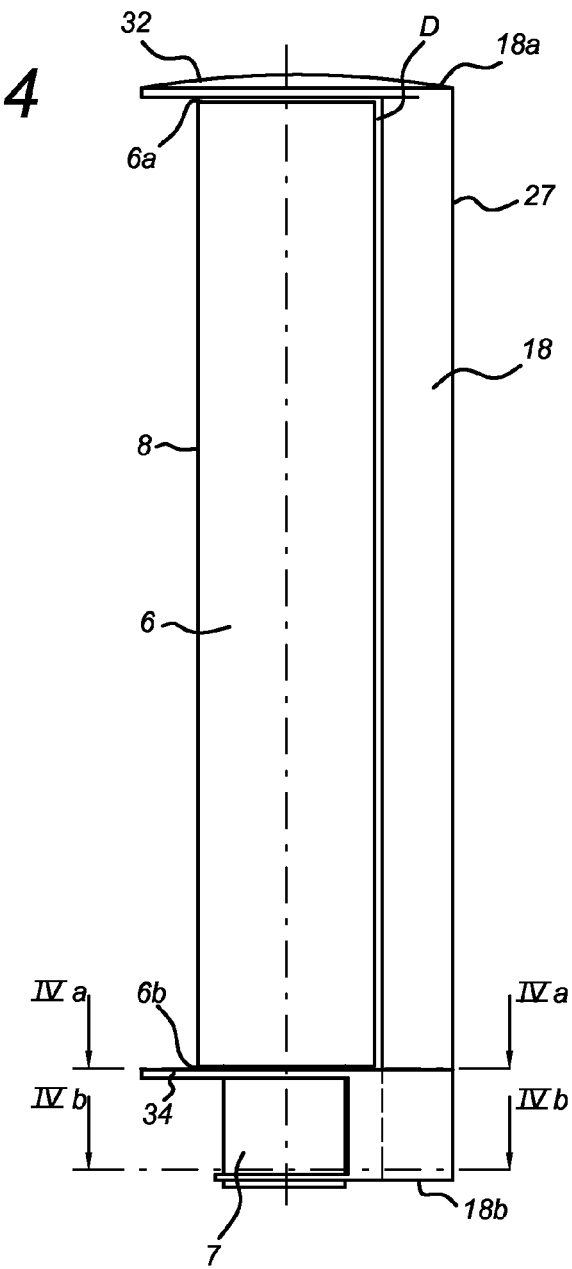
FIG. 4 shows a front view of the rotor and the flap in assembled state.
Figure 4A:
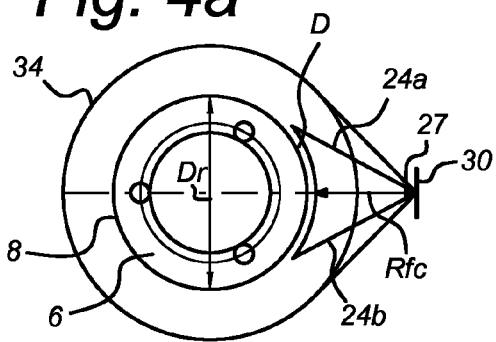
FIG. 4a shows a transversal cross section of the rotor and the flap in assembled state along lines IVa-IVa as shown in FIG. 4.
Figure 4B:
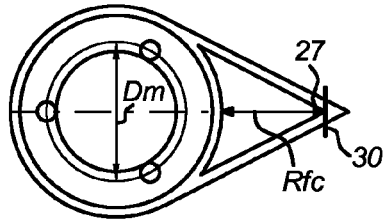
FIG. 4b shows a transversal cross section of the rotor and the flap in assembled state along lines IVb-IVb as shown in FIG. 4.

FIG. 4 shows a front view of the rotor 6 and the flap 18 in assembled state. Transversal cross sections of the rotor 6 and the flap in assembled state along lines IVa-IVa and IVb-IVb are shown in FIG. 4*a* and FIG. 4*b*, respectively. The rotor 6 comprises an upper plate 32 and a lower plate 34 delimiting the total height of the rotor 6. The lower plate 34 is located on the static mast 7. Both, the upper and lower plates 32, 34 extend transversally each side of the peripheral wall 8 of the rotor 6. It will be appreciated from the view of the transversal cross section along the line IVa-IVa, that the lower plate 34 comprises a trailing edge that coincides with the shape of the wedge flap 18. Moreover, it can be appreciated from the transversal cross sections IVa-IVa and IVb-IVb that the wedge flap 18 is positioned at a distance D from the rotor 6. Furthermore, the wedge flap 18 extends substantially parallel to the rotational axis of the rotor 6 and the lower end 18*b* of the wedge flap 18 is at its most lower part, substantially parallel to the static mast 7 as shown in the transversal cross section IVb-IVb. The diameter Dm of the static mast 7 is preferably between 50%-80% the diameter of the rotor 6. It will be appreciated that the length of the flap chord Rfc is preferably between 10%-70%, and most preferably between 40%-70% of the diameter Dr of the rotor 6. The total length of the flap chord Rfc could for instance be calculated taking 50% of the diameter Dr of the rotor 6 and 20% the distance D between the peripheral wall 8 of the rotor 6.

Figure 5:
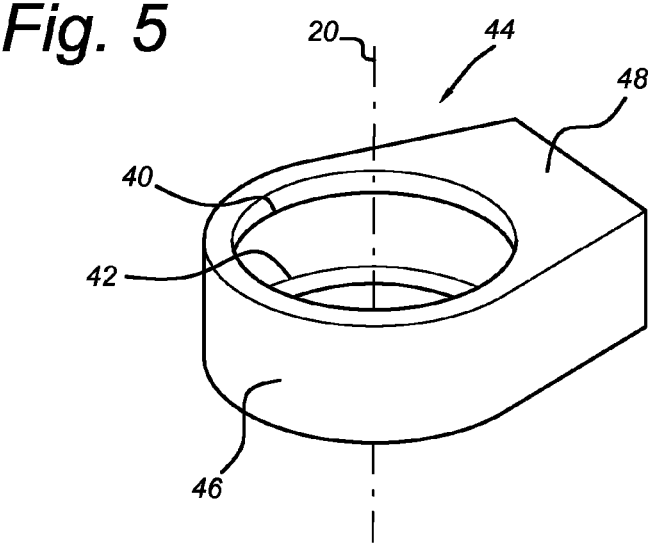
FIG. 5 shows a perspective view of the flap hinge.

FIG. 5 shows a perspective view of the flap hinge 44 in a disassembled state. The flap hinge 44 comprises a ring part 46 and a support part 48. The ring part 46 comprises in its interior side a upper bearing 40 and a lower bearing 42. The flap hinge 44 will be slid into the static mast 7 while the flap 18 is securely connected to the support part 48 of the flap hinge 44. It will be appreciated that the upper and lower bearings 40, 42 assist rotation of the flap hinge 44 with reference to the to the longitudinal center line 20, and the flap 18 can be oriented parallel to the rotational axis of the rotor 6. Moreover, the upper and lower bearings 40, 42 provide relative motion of the flap 18 with respect to the static mast 7.

Figure 6:
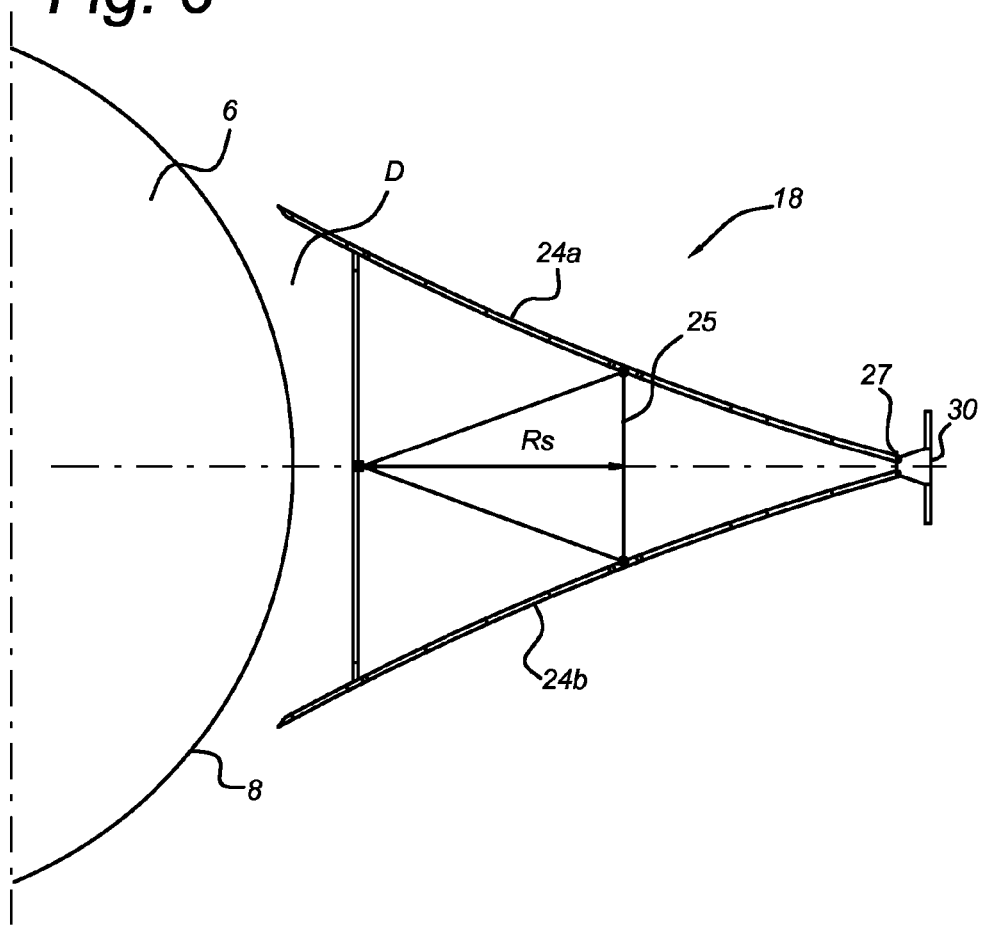
FIG. 6 shows a detailed view of the wedge flap and the winglet in assembled state.

FIG. 6 shows the wedge flap 18 in its operating state comprising its trailing edge 27 a winglet 30 rigidly connected to the flap trailing edge 27. It will be appreciated that the wedge flap 18 further comprises a triangular support structure 25 providing extra strength to the wedge flap 18 and therefore increasing the structure stability during conditions of heavy wind. Moreover, the support structure 25 will preferably have a chord Rs between 40%-70% of the flap chord Rfc. As it can be seen, the winglet 30 has a symmetrical structure extending equally at each side of the flap trailing edge 27.

Figure 7:
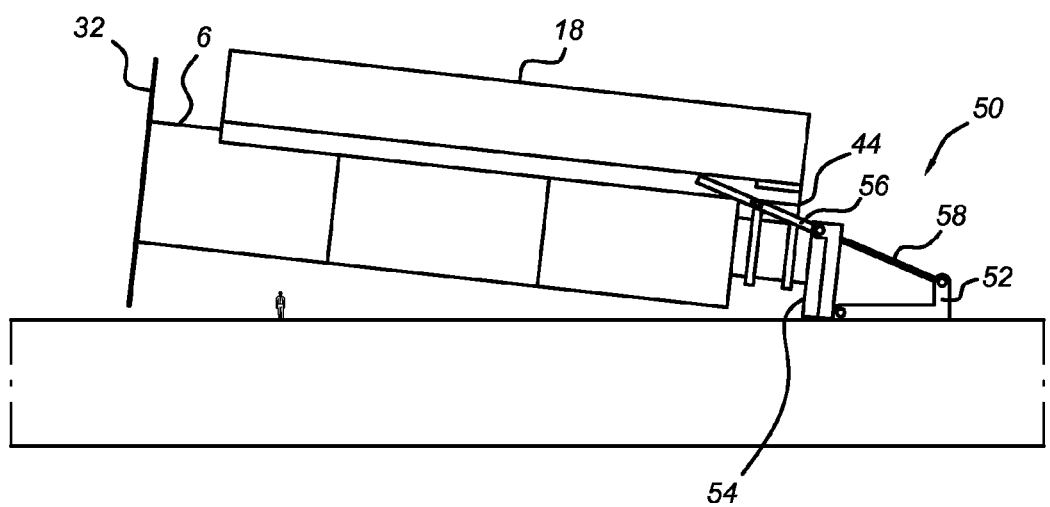
FIG. 7 shows the rotor and the flap hingedly connected in a retracted state.

FIG. 7 shows the rotor 6 and the flap 18 in assembled state, wherein the assembly is in a substantially horizontal retracted position. The rotor 6 and flap 18 are supported by a symmetrical hinge assembly 50 comprising a lower hinge part 52 and a upper hinge part 54. The lower hinge part 52 is securely attached to the deck 2. A hydraulic system, comprising a piston, connects the rotor 6 and the flap 18 with the lower hinge part 52 and therefore the deck 2 of the vessel 1. The hydraulic system comprises a cylindrical body 58 that can reciprocate within a hollow cylinder 56. The hollow cylinder 56 connects the upper hinge part 54 with the flap hinge 44, while the cylindrical body 58 connects the lower hinge part 52 and the upper hinge part 54. Opposite to the cylindrical body 58, is where the lower hinge part 52 and upper hinge part 54 are connected together. The hydraulic system will be limiting the angle of inclination between the lower hinge part 52 and the upper hinge part 54. Preferably, the angle of inclination lies between 70°-90°.

The invention claimed is:

1. Vessel comprising a hull and a deck, a substantially cylindrical rotor having a peripheral wall rotatable with respect to the deck around a longitudinal center line, the rotor being mounted on the deck in such a manner that in an operational state the rotor is substantially vertically oriented, wherein a flap is arranged near the rotor extending substantially in a plane which is parallel to the rotational axis of the rotor, and the length of the flap chord is between 20%-90% of the rotor diameter, wherein the position of the flap can be adjusted with reference to the longitudinal center line;

wherein the flap comprises a leading edge and a trailing edge; and wherein the flap comprises a winglet on the flap trailing edge.

2. Vessel according to claim 1, wherein the flap comprises an upper end and a lower end, the lower end of the flap being guided along a circular trajectory supported on the deck, the center of the circular trajectory being aligned with the longitudinal center line of the rotor.

3. Vessel according to claim 2, wherein the flap is hingedly connected to the rotor at a position on the longitudinal center line above or at the upper end of the rotor via the upper end of the flap.

4. Vessel according to claim 1, wherein the flap comprises an upper end and a lower end, the flap being hingedly connected near the lower end of the rotor at a position on the longitudinal center line via the lower end of the flap or the flap being hingedly connected to the rotor near the upper end of the rotor at a position on the longitudinal center line via the upper end of the flap.

5. Vessel according to claim 4, wherein both the upper end and the lower end of the flap are hingedly connected near the respective rotor end, at a position on the longitudinal center line to the rotor.

6. Vessel according to claim 1, wherein the leading edge of the flap is positioned at a distance from the peripheral wall of the rotor of between 0-1 meters.

7. Vessel according to claim 1, wherein the flap is provided with flap positioning means that allow the flap to be positioned in such a way that the chord of the flap is at an angle a of between 30°-60° from an apparent wind.

8. Vessel according to claim 1, wherein the flap is a wedge flap.

9. Vessel according to claim 1, wherein a wedge flap chord length is between 10%-70% of the rotor diameter.

10. Vessel according to claim 1, wherein a wedge flap comprises side walls joining in the trailing edge having a maximum angle of 150° with respect to each other relative to their joining position at the trailing edge.

11. Vessel according to claim 1, wherein the winglet transversally extends away from the flap chord about 0.5-1 meter at each side of the flap trailing edge.

12. Vessel according to claim 1, wherein the winglet extends substantially perpendicular to the flap chord.

13. Method of operating the rotor according to claim 1 comprising the step of orienting the flap such that the flap chord has an angle $\beta$ between 45°-60° relative to the longitudinal center line.

* * * * *